(12) United States Patent
White et al.

(10) Patent No.: US 6,306,028 B1
(45) Date of Patent: Oct. 23, 2001

(54) HEAD MEAT RECOVERY

(75) Inventors: Raymond Malcolm White, Capalaba; Andrew Leslie Finney, Crestmead; Michael George Ross, Mooloolaba, all of (AU)

(73) Assignees: The Commonwealth of Australia Commonwealth Scientific and Industrial Research Organization, Campbell; Meat Research Corporation, New South Wales, both of (AU)

( * ) Notice: Subject to any disclaimer, the term of this patent is extended or adjusted under 35 U.S.C. 154(b) by 0 days.

(21) Appl. No.: 09/043,796

(22) PCT Filed: Aug. 2, 1996

(86) PCT No.: PCT/AU96/00488

§ 371 Date: Mar. 30, 1998

§ 102(e) Date: Mar. 30, 1998

(87) PCT Pub. No.: WO97/05782

PCT Pub. Date: Feb. 20, 1997

(30) Foreign Application Priority Data

Aug. 4, 1995 (AU) .................................................. PN 4619

(51) Int. Cl.[7] ............................... A22C 17/02; A22B 5/16
(52) U.S. Cl. ......................... 452/135; 452/125; 452/128; 452/136
(58) Field of Search .................................. 452/125, 128, 452/135, 136, 160

(56) References Cited

U.S. PATENT DOCUMENTS

| 1,059,339 | * | 4/1913 | Bloss | 452/135 |
| 1,764,551 | * | 6/1930 | Dolzer | 452/135 |
| 2,186,273 | * | 1/1940 | Schmidt | 452/135 |
| 4,237,580 | * | 12/1980 | Croasdell | 452/135 |
| 4,262,386 | * | 4/1981 | Saget | 452/135 |
| 4,543,689 |   | 10/1985 | Couture | 452/135 |
| 4,918,788 | * | 4/1990 | Passchier | 452/135 |
| 5,372,538 | * | 12/1994 | Ketels | 452/135 |
| 5,512,013 | * | 4/1996 | Passchier | 452/135 |
| 5,533,928 | * | 7/1996 | Karubian et al. | 452/135 |

FOREIGN PATENT DOCUMENTS

| 158354 | * | 1/1983 | (DE) | 452/136 |
| 197615 | * | 10/1986 | (EP) | 452/135 |
| WO 88/07329 | * | 10/1988 | (WO) | 452/135 |
| WO 91/19422 | * | 12/1991 | (WO) | 452/135 |
| WO 93/20703 | * | 10/1993 | (WO) | 452/135 |
| WO 94/02024 | * | 2/1994 | (WO) | 452/135 |

* cited by examiner

Primary Examiner—Michael J. Carone
Assistant Examiner—Fredrick T. French, III
(74) Attorney, Agent, or Firm—McDermott, Will & Emery

(57) ABSTRACT

Apparatus for recovering meat from the head of a slaughtered animal. A jaw support clamps and supports the head by clamping the jaw. Cheek pullers having clamps engage with and hold the cheeks of the animal head in the vicinity of the mouth. A drive arrangement has a lateral drive for moving the cheek pullers outwardly away from each other and has a posterior drive for moving the cheek pullers in the posterior direction so as to pull tissues from both the jaw and the skull. A jaw separation means comprises a snout ring to be fitted to the snout of the skull and a drive moves the snout ring so as to move the skull relative to the jaw with an at least partially arcuate path of movement so as to continue to open the mouth wider as or after the cheek meat is removed from the animal head.

15 Claims, 5 Drawing Sheets

HEAD MEAT RECOVERY

This invention relates to recovery of meat from the head of a slaughtered animal such as slaughtered cattle.

In an abattoir, the recovery of meat such as the cheek meat and papillae from cattle heads is generally a manual operation in which an operator cuts along the surfaces of the bones of the skull and jaw and through connecting tissues. The operation is labour intensive and frequently much of the meat recovered is in the form of relatively small pieces which have low value. Frequently also substantial amounts of meat remain attached and are not recovered.

In US Pat. No. 4,543,689 there is described an apparatus for recovering head meat from a cattle skull. The skull (with the lower jaw already removed) is located and held on a table. Two sets of projections are engaged with opposite sides of the skull and are hydraulically moved rearwardly to pull the cheek meat from the skull. Some preliminary cuts to tendons facilitate removal of the meat. This apparatus requires substantial preliminary work in separating the jaw and it is doubtful that any additional meat to what is recovered by purely manual methods will be recovered using this apparatus.

It is an object of the present invention to provide apparatus for use in effectively recovering meat from the head of a slaughtered animal in a partially mechanised manner.

It is a preferred object to provide apparatus enabling recovery of greater amounts of head meat.

It is a further preferred object to provide apparatus enabling recovery of meat in dentifiable portions so that the meat has a higher saleable value.

According to the present invention there is provided apparatus for recovering meat from the head of a slaughtered animal, the apparatus including: a jaw support for supporting the head of a slaughtered animal, cheek pullers for engaging with and holding the cheeks of the animal head in the vicinity of the mouth, and a drive arrangement for moving the cheek pullers outwardly relatively away from each other and also relative to the animal head held by the jaw support in the posterior direction so as to pull tissues from both the jaw and the skull.

The jaw support preferably comprises a support member and a jaw support clamp operative to clamp the jaw against the support member to restrain the jaw against movement. The jaw support is preferably arranged to support the jaw so that the muzzle of the animal head is directed upwardly. In this embodiment, the jaw support may be arranged to support and hold the jaw at an angle to the vertical so that the skull tends to fall away from the jaw and thereby open the mouth.

The apparatus preferably further includes a mouth opening projection, the projection in use passing through the jaw from the underside of the jaw towards the skull so as to contact the surface of the palate of the skull when the jaw is held by the jaw support whereby the skull will be pushed away from the jaw by the projection and held so that mouth remains open.

Each cheek puller may comprise a cheek clamp for positioning at a respective one of the opposite sides of the mouth, each cheek clamp comprising two clamp jaws, one of the clamp jaws being located against the inside papillae and the other clamp jaw being located against the outside muscle surface. The jaw support may be selectively rotatable about a transverse axis enabling selective rotational movement of the head to present the cheeks at a substantially fixed location regardless of the size of the animal head.

Preferably the drive arrangement for moving the cheek pullers comprises a lateral drive which is selectively operable to move the cheek pullers outwardly away from each other so as to thereby pull the cheeks away from the skull and jaw, and a posterior drive for moving the cheek pullers relatively to the head in the posterior direction. The lateral drive is preferably operable to move the cheek pullers outwardly away from each other in a first stage of operation of the drive arrangement and, in a second simultaneous or subsequent stage, the posterior drive is operable to move the cheek pullers relative to the head in the posterior direction.

The cheek pullers may be mounted by a support structure, the posterior drive being operable to linearly move the support structure relative to the animal head in the posterior direction. In this embodiment, the lateral drive may comprise support arms having outer ends to which the cheek pullers are mounted, the support arms being pivotally mounted to the support structure and the lateral drive being operable to pivotally move the support arms selectively away from each other about their pivot connections to the support structure.

The apparatus may include a jaw separation means operable to separate the skull from the jaw during and/or after the cheek meat is removed from the animal head. The jaw separation means preferably comprises a head clamp arranged to be fitted to the snout of the skull and drive means for moving the head clamp so as to move the skull relative to the jaw held by the jaw support with an at least partially arcuate path of movement so as to continue to open the mouth wider as or after the cheek meat is removed from the animal head. The head clamp may comprise a snout ring which encloses the snout of the skull when the jaw is mounted by the jaw support. The snout ring may be mounted at the end of a support arm which projects out above the animal head when supported by the jaw support, the support arm being movable downwardly to engage the snout ring around the snout.

In the preferred embodiment, the drive means associated with the head clamp is operative to move the head clamp relative to the jaw with a linear component of movement in the posterior direction. The drive means associated with the head clamp may be operative to effect the linear movement in the posterior direction for a predetermined distance followed by a combined arcuate and linear movement in the posterior direction. The support arm for the snout ring may be pivotally mounted to the support structure which mounts the cheek pullers whereby, as the support structure is moved in the posterior direction, the pulling force applied to the snout through the support arm and snout ring together with the intact connection of the jaw to the skull will open the mouth wider by arcuate movement of the skull relative to the jaw supported by the jaw support.

Possible and preferred features of the present invention will now be described with particular reference to the accompanying drawings. However it is to be understood that the features illustrated in and described with reference to the drawings are not to be construed as limiting on the scope of the invention. In the drawings.

Figure 1:
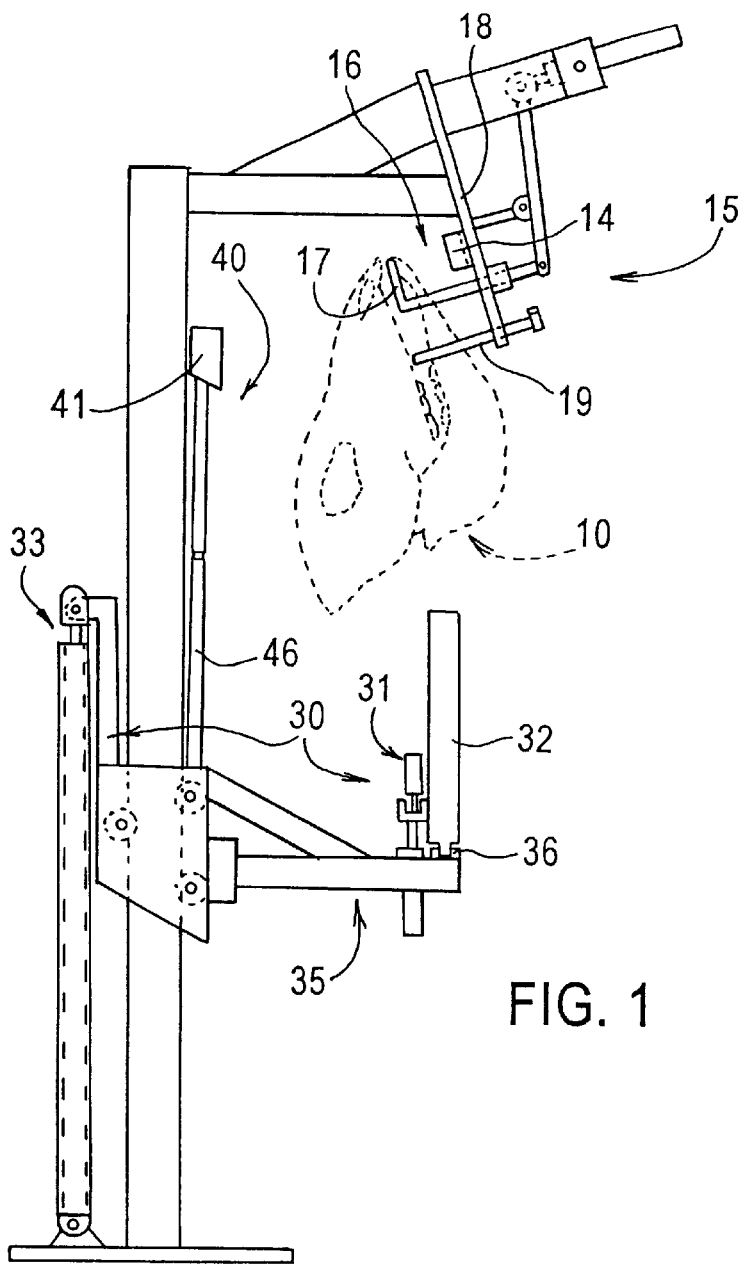
FIG. 1 is a side view of a possible apparatus according to the invention.
Figure 5:
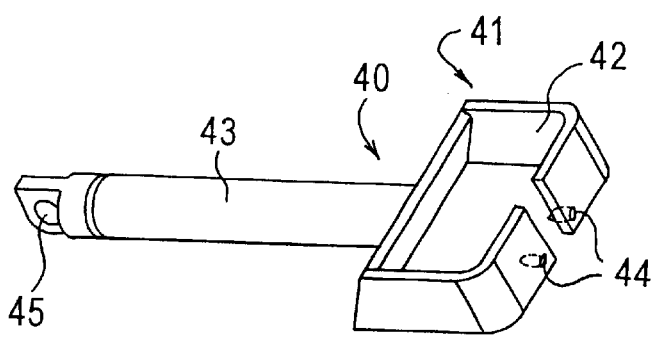
FIG. 5 is a perspective view of a head clamp.

The apparatus according to the invention includes a jaw support 15 for supporting the head 10 of a slaughtered animal. Cheek pullers 20 engage with and hold the cheeks 13 the animal head 10 the vicinity of the mouth, and a drive arrangement 30 moves the cheek pullers 20 outwardly away from each other and also reative to the animal head 10 held by the jaw support 15 in the posterior direction A so as to pull the tissues from both the jaw 12 and the skull 11.

Some manual operations may be carried out on the head 10 before or when the head is mounted by the jaw support 15 or before during or after the cheek pullers 20 are engaged and operated. Such operations can have a relatively modest labour demand compared to current manual operations. For example, such tasks may include:

(1) A small cut may be formed under the eye during meat removal particularly on old animals with calcified bones. However, this cut is not required on most beef heads since the outward force applied through the cheek pullers 20 folds the muscle-bone connection backwards to weaken and peel the meat off the head.

(2) The caudal end of the m.temporalis may be severed from the parietal and temporal bone surfaces.

(3) An inside cut may be made, for example, a straight cut severing the muscle tissue beside the distal surface of the hyoid bones with the point of the knife penetrating the m.pterygoideus medialis at the distal surface of the perpendicular part of the palatine bone and extend the knife in the anterior direction until the end of this cavity is reached. The knife is inserted again into the previous position with the blade facing in the posterior direction. A similar cut is made to clear the muscle tissue from the remainder of the hyoid and palatine bones with the knife cut separating the parotid gland from the jaw 12.

(4) The meat may be also cleared from the inside of the jaw 12 by placing a knife steel between the m.pterygoideus medialis (sweet meat) and the insides of the jaw bone to clear the lower jaw area.

These manual tasks can help recovery of large portions of identifiable meat in subsequent use of the apparatus.

The jaw support 15 is arranged to support the jaw 12 so that the muzzle is directed upwardly. The jaw support 15 comprises a jaw support clamp 16 which, as illustrated in the accompanying drawings, includes a jaw support hook 17. After the head 10 has been hung on the hook 17 by passing the point of the hook through the jaw 12 from the underside, the hook 17 is retracted back towards the support arm 18 by which the hook is mounted so as to clamp the jaw 12 and hold it firmly against the support arm against movement. The jaw 12 is held at an angle to the vertical so that the skull 11 tends to fall away from the clamped jaw 12 and open the mouth. A mouth opening projecting shaft 19 is also provided on the support arm 18 below the jaw support hook 17, the shaft 19 extending so as to pass through the jaw 12 from the underside of the jaw. The shaft 19 is adjustable in the length. Alternatively, the projection 19 may be pivotally or otherwise adjustably mounted to the support arm 18 to be movable up or down to adjust the position of contact on the palatine process of maxilla (hard palate). In either case it projects towards the skull 11 so that in use it is fixed to extend towards and to contact the surface of the palate when the jaw 12 is clamped so that the skull 11 will be pushed away from the jaw 12 and held firmly with the mouth open (see FIG. 2b) thereby assisting later location of components of the apparatus relative to the head 10.

Figure 3:
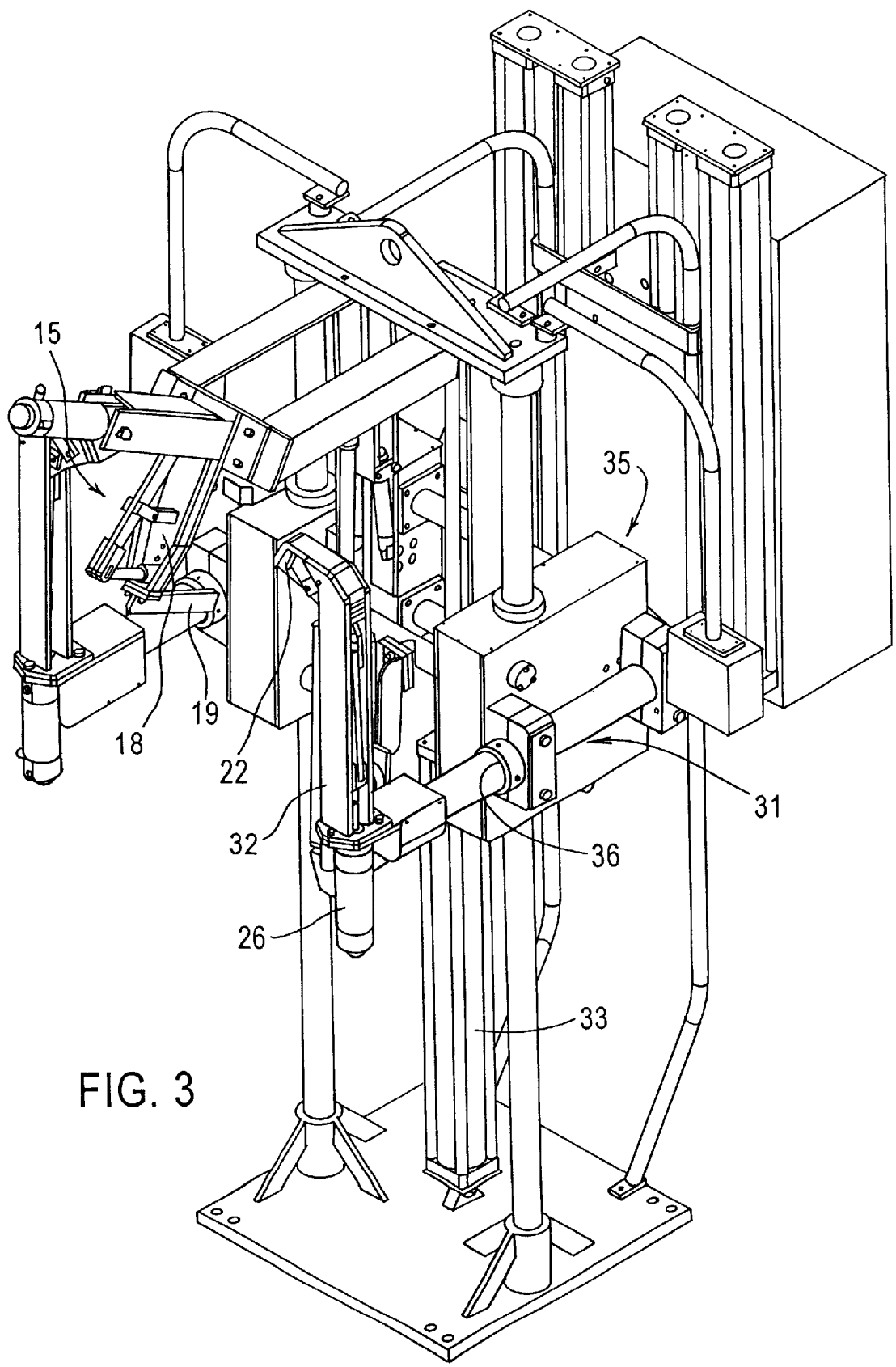
FIG. 3 is a perspective view of possible apparatus according to the invention (not including the head clamp)
Figure 4:
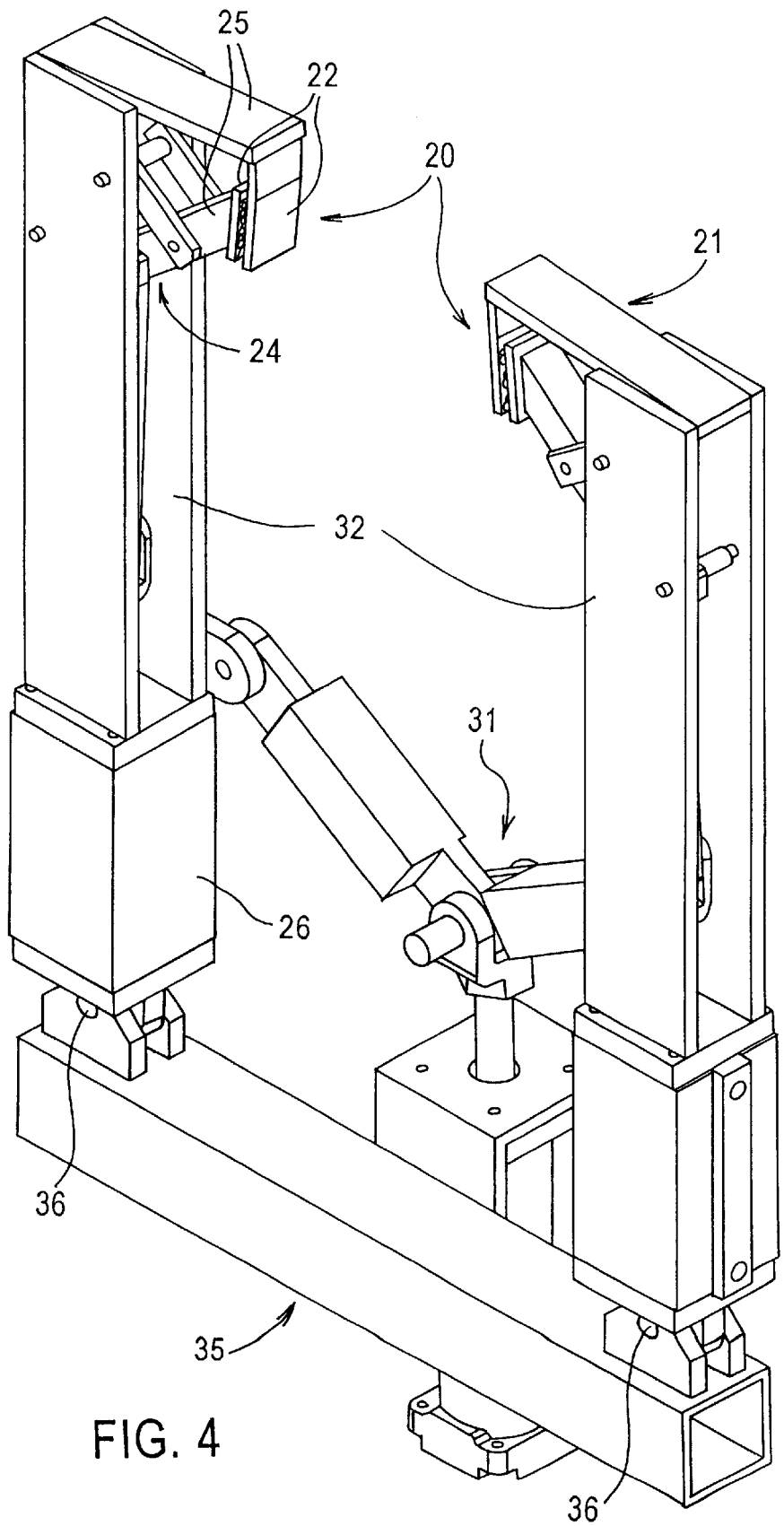
FIG. 4 is a view of the cheek clamps and an alternative mounting.

The cheek pullers 20 comprise cheek clamps 21 which may be positioned by an operator or positioned automatically at the sides of the mouth. Each clamp 21 has two clamp jaws 22, one of which is located against the inside papillae and the other against the outside muscle surface of the cheek 13. To facilitate automatic location of jaw clamps 22, the jaw support 15 may be movable, e.g. to rotate heads from small animals about a horizontal transverse axis, so that the cheeks 13 are located in positions enabling automatic cheek clamp location regardless of the head size. When positioned as desired, the operator can activate a clamping mechanism 24 so as to close the respective clamp jaws 22 together so as to firmly grasp the cheeks 13 of the animal head 10. In the possible arrangements illustrated in FIGS. 1, 3 and 4, the cheek clamp jaws 22 are mounted by respective support arms 25 which are movable by hydraulic or pneumatic rams 26 to open and close the jaws 22.

The drive arrangement 30 for moving the cheek pullers 20 relative to the animal head 10 is operable to move the cheek pullers 20 laterally outwardly away from each other in a first stage of movement and, in a second subsequent stage, is operable to move the cheek pullers 20 in a posterior direction A relative to the head, although if desired the lateral and linear posterior movements may be at least partially simultaneous.

The drive arrangement 30 includes a lateral drive 31 which is selectively operable to move the cheek pullers 20 outwardly away from each other so as to thereby pull the cheeks 13 away from the skull 11 and jaw 12. This can enable visual inspection of the progress of the operation and, by applying tension to the tissues being pulled away from the head, can effect separation from the head and also, where needed, can assist separation from the head where an operator needs to make manual cuts if the tissues are not pulling effectively from the bones. During the movement of the cheek pullers 20, if the clamped tissues 13 are not peeling or pulling cleanly away from the head, the attendant operator(s) can make minimal cuts with a boning knife where the clamped tissues are not readily separating from the head. For example, with older animals, calcification on the cheek bones near the eyes can lead to strong adherence of the cheek tissues so that making cuts along the surface of the cheek bones during the pulling operation can help to ensure that the maximum meat is being separated from the head.

In addition to the lateral drive 31 for moving the cheek pullers 20 away from each other, the drive arrangement 30 also includes a linear posterior drive 33 for moving the cheek pullers 20 relatively to the head 10 in the posterior direction A. In the illustrated embodiments, the cheek pullers 20 are mounted by a support structure 35 which is linearly moveable relative to the head 10 in the posterior direction A, the linear posterior drive 33 being arranged to move the support structure 35. In the illustrated arrangement where the head 10 is mounted so that the muzzle is directed upwardly, the linear posterior drive 33 is operable to move the cheek pullers 20 in a downwards direction so as to pull or peel or strip the tissues 13 held by the pullers from the jaw 12 and the skull 11.

The lateral drive 31 comprises clamp support arms 32 which are provided with the cheek clamps 21 at their outer ends, the support arms 32 being pivotally mounted at pivots 36 to the support structure 35 and the lateral drive 31 being operable to pivotally move the clamp support arms 32 selectively towards and away from each other about their pivot connections 36 to the support structure. In addition to enabling outward movement of the cheek clamps 21, this lateral movement also enables sideways adjustment to accommodate different sized animal heads before the clamps 21 are engaged with the cheeks 13.

The drive arrangement 30 may include any suitable drive means for effecting the desired movements. For example, hydraulic rams, oil dampened pneumatic rams, electric ball screw drive units, electric tooth belt drives, pneumatic actuators with ball screw brakes, or pneumatic actuators with separate hydraulic speed control units can be used as desired.

The apparatus includes a jaw separation means 40. The jaw separation means is operable to separate the skull 11 from the jaw 12 during and/or after the cheek meat is stripped from the head. This will enable the edible product from the back of the jaw 12 to be recovered.

The jaw separation means 40 comprises a head clamp 41 which is operative to be fitted to the snout of the skull 11. The head clamp 41 comprise a snout ring 42 or the like which encloses the snout, e.g. when the jaw 12 is mounted on the jaw support 10 or after the jaw is clamped. The snout ring 42 is lowered from above onto the snout. The snout ring 42 is mounted on the end of a support arm 43 which projects out above the head 10 when supported on the jaw support 15 and which is movable downwardly to engage the snout ring around the snout. The snout ring 42 is generally rectangular and has inwardly directed pins 44 to engage and grip inside the upper jaw.

The head clamp 41 has associated drive means 33 operative to move the skull 11 relative to the jaw 12 which is clamped and held in position with an at least partially arcuate path of movement so as to continue to open the jaws wider apart as or after the cheek meat is stripped. Also the path of movement of the head clamp 41 relative to the jaw 12 includes a linear component of movement in the posterior direction A. The linear movement in the posterior direction may be carried out firstly for a predetermined distance followed by a combined arcuate and continued linear movement These two modes of movement will separate a beef skull 11 from the jaw 12 with minimal force without breaking the bones and maintaining the connection of the muscle tissue to the jaw bone for facilitating recovery.

Figure 2A:
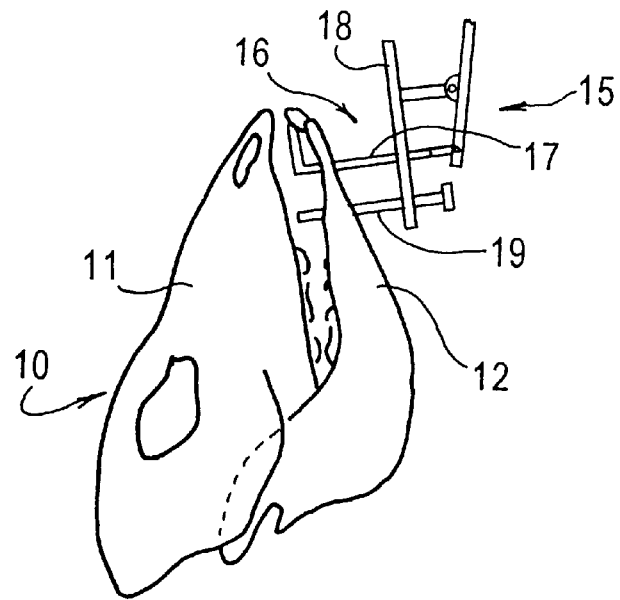
FIGS. 2a to 2d illustrate in side view a sequence of operations of the apparatus.
Figure 2B:
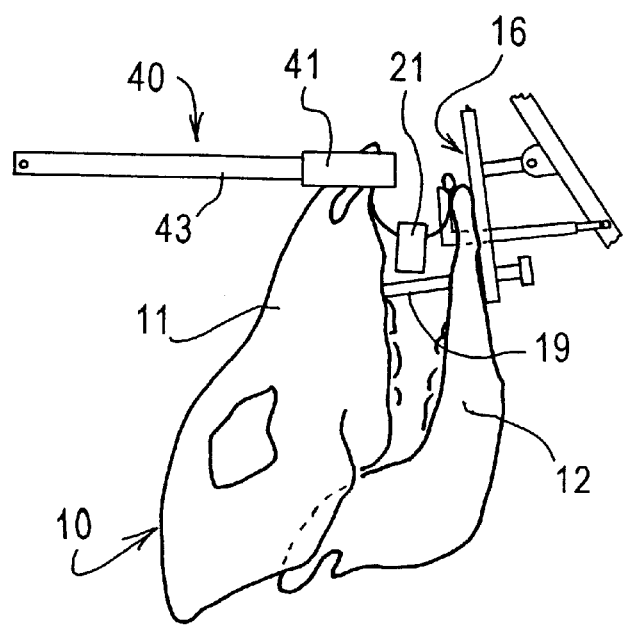
Figure 2C:
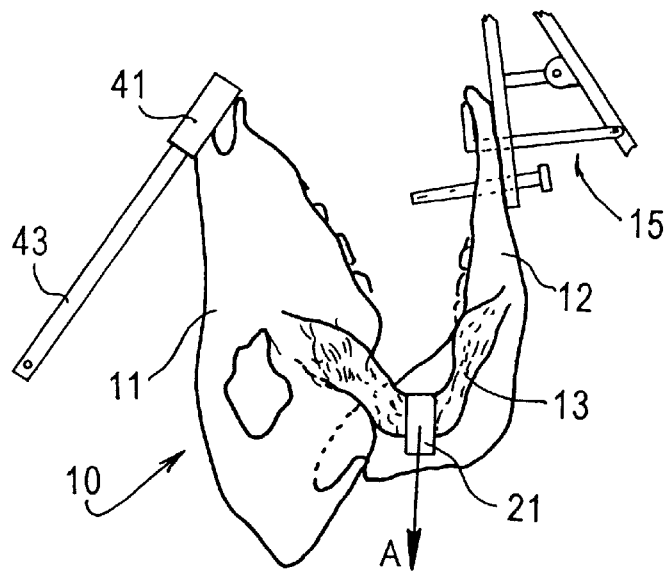
Figure 2D:
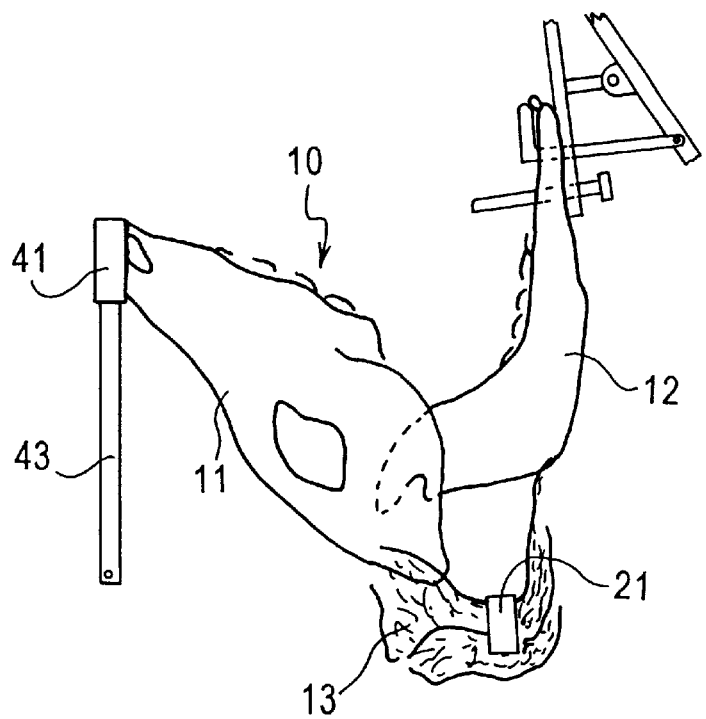

To achieve the linear and arcuate movements, the support arm 43 for the snout clamp ring 42 has a pivot 45 mounting the arm to an upright member 46 which is mounted for movement with the support structure 35 which mounts the cheek clamps 21. With this arrangement and as illustrated in FIGS. 2b to 2d, the snout clamp ring 42 is engaged with the snout while the support arm 43 is horizontal. As the support structure 35 is moved downwardly, the downward pulling force applied to the snout through the support arm 43 together with the intact connection of the lower jaw 12 to the skull 11 will tend to open the mouth wider by arcuate movement of the skull. This arcuate movement will help maintain tension on the tissues 13 being stripped from the head. As the skull 11 moves towards an inverted position and the tissue connections with the clamped lower jaw 12 are weakened, broken and/or cut, the skull can drop away from the clamped jaw. The downward linear movement of the support structure 35 and therefore of the support arm 43 for the snout clamp 42 ring assists the linear downwards movement of the skull 11 and hence separation from the clamped jaw 12. At the end of the downward movement of the support structure 35, the support arm 43 is nearly vertical and can be returned to a start position above the jaw support 15 in the vertical position before being returned to the horizontal position for lowering onto the snout of the animal head to be processed.

Various modifications can be made to the apparatus described and illustrated herein without departing from the scope of the invention. For example, the jaw support 15 can be selectively moveable to hold the head in different positions for small and large animals, thereby enabling the cheeks and teeth to be presented to the cheek clamps 21 at the same position regardless of the size of the head. In an alternative embodiment, a V-shaped member 14 having a notch facing the jaw is mounted by the support arm 18. When the jaw clamp 16 is operated, the tip of the jaw 12 enters the notch forcing the tip to rotate. On a very small head the curve of the tip of the jaw is greater per unit of length than on a large head, thereby causing the head to be rotated to a greater degree. This automatically locates small and large heads enabling the cheeks 13 to be presented to the cheek clamps 21 at the same position regardless of the size of the head. On a very large head, the weight and length of the head may prevent the jaw rotating to any degree.

In another modification, all components of the apparatus below the head may be positioned towards the back of the machine to enable the head to be discarded to a side chute or into a floor level opening.

Also if desired, associated washing or sterilising apparatus may be provided for components which may become contaminated, such as the cheek clamps 12. For example the cheek clamps 20 may be pivoted or rotated further outwardly or towards the back of the apparatus after recovery therefrom of the stripped meat, and the clamps may be inserted into sterilising enclosures for hot water cleansing prior to re-use on the next head to be processed.

A summary of possible process operations involving use of the apparatus described and illustrated herein may be as follows:

Operator: Transport the head 10 from a conventional chain and position onto the jaw support hook 17. Start machine cycle.

Machine: Close jaw clamp 16 to secure the lower jaw 12 and force the mouth open. Position cheek clamps 21 at the cheek and papillae surfaces. Close cheek clamps 21 and commence head meat strip cycle. Exert outward force on the cheek meat.

Operators: Knife cut separation of the muscle and lip tissue beginning at the anterior section of the jaw 12 and skull 11. Both operators must press respective foot switches for the machine to exert downward force on the cheek meat. This operation only requires one foot switch to be pressed after the cheek clamp on the other side has been released. During the application of the downward force, the operators strip the meat from the head and jaw by knife cuts at the musclelbone connection where peeling from the bone does not occur. Cutting of the muscle tissue may be also required at the back of the jaw opening and to separate the stripped meat from the muscle tissue of the inside of the jaw Machine: Break skull 11 away from the jaw 12. Release cheek clamps 21. Release jaw clamp 16.

Operator 1: Remove cheek meat 13 from machine. Remove skull 11 from machine. Start machine wash/ sterilise cycle.

Operator 2: Remove jawbone 12 from machine and bone out edible tissue from the inside and back of the jaw 12.

The operator can use the apparatus to separate the papillae and cheek muscle prior to release from the cheek clamps. This can assist in preventing the papillae surface contacting and contaminating the cheek muscle.

The apparatus of the present invention and the process of utilising that apparatus can enable an increase in the amount of meat recovered from a slaughtered animal's head since muscle tissue is removed from areas of the head that current practice does not achieve. The apparatus also can have a desirable ergonomic design so that the process operators are not required to carry out strenuous tasks. The labour requirements to recover the meat portions can be reduced compared to current practices. The recovered meat value may be increased since the meat retrieved from the head can be presented in portions that are easily identifiable and this means that the meat has a higher value since it is not classified as low value head meat trim.

What is claimed is:

1. Apparatus for recovering meat from the head of a slaughtered animal, the apparatus including: a jaw support for supporting the head of a slaughtered animal, a mouth opening projection which passes through the jaw from the underside of the jaw towards the skull so as to contact the surface of the palate of the skull when the jaw is held by the jaw support whereby the skull will be pushed away from the jaw by the projection and held so that mouth remains open, cheek pullers located and mounted in association with the jaw support and operable for engaging with and holding the cheeks of the animal head in the vicinity of the mouth when the head is supported by the jaw support, and a drive arrangement operatively coupled to the cheek pullers for moving the cheek pullers outward relatively away from each other and also relative to the animal head held by the jaw support in the posterior direction so as to pull tissues from both the jaw and the skull.

2. Apparatus for recovering meat from the head of a slaughtered animal, the apparatus including: a jaw support for supporting the head of a slaughtered animal, cheek pullers located and mounted in association with the jaw support and operable for engaging with and holding the cheeks of the animal head in the vicinity of the mouth when the head is supported by the jaw support, each cheek puller comprising a cheek clamp for positioning at a respective one of the opposite sides of the mouth, each cheek clamp comprising two clamp jaws, one of the clamp jaws being located against the inside papillae and the other clamp jaw being located against the outside muscle surface, and a drive arrangement operatively coupled to the cheek pullers for moving the cheek pullers outward relatively away from each other and also relative to the animal head held by the jaw support in the posterior direction so as to pull tissues from both the jaw and the skull.

3. Apparatus for recovering meat from the head of a slaughtered animal, the apparatus including: a jaw support for supporting the head of a slaughtered animal, the jaw support comprising a support member and a jaw support clamp operative to clamp the jaw against the support member to restrain the jaw against movement, the jaw support being arranged and operative to support the jaw so that the muzzle of the animal head is directed upwardly, cheek pullers located and mounted in association with the jaw support and operable for engaging with and holding the cheeks of the animal head in the vicinity of the mouth when the head is supported by the jaw support, and a drive arrangement operatively coupled to the cheek pullers for moving the cheek pullers outward relatively away from each other and also relative to the animal head held by the jaw support in the posterior direction so as to pull tissues from both the jaw and the skull.

4. Apparatus as claimed in claim 3, wherein the jaw support is arranged to support and hold the jaw at an angle to the vertical so that the skull tends to fall away from the jaw and thereby open the mouth.

5. Apparatus as claimed in claim 3, wherein the drive arrangement for moving the cheek pullers comprises a lateral drive which is selectively operable to move the cheek pullers outwardly away from each other so as to thereby pull the cheeks away from the skull and jaw, and a posterior drive for moving the cheek pullers relative to the head in the posterior direction.

6. Apparatus as claimed in claim 5 wherein the lateral drive is operable to move the cheek pullers outwardly away from each other in a first stage of operation of the drive arrangement and, in a second stage of operation of the drive arrangement the posterior drive is operable to move the cheek pullers relative to the head the posterior direction.

7. Apparatus as claimed in claim 5 wherein the cheek pullers are mounted by a support structure, the posterior drive being operable to linearly move the support structure relative to the animal head in the posterior direction.

8. Apparatus as claimed in claim 7 wherein the lateral drive comprises support arms having outer ends to which the cheek pullers are mounted, the support arms being pivotally mounted to the support structure and the lateral drive being operable to pivotally move the support arms selectively away from each other about their pivot connections to the support structure.

9. Apparatus for recoving meat from the head of a slaughtered animal, the apparatus including: a jaw support for supporting the head of a slaughtered animal, cheek pullers located and mounted in association with the jaw support and operable for engaging with and holding the cheeks of the animal head in the vicinity of the mouth when the head is supported by the jaw support, a drive arrangement operatively coupled to the cheek pullers for moving the cheek pullers outward relatively away from each other and also relative to the animal head held by the jaw support in the posterior direction so as to pull tissues from both the jaw and the skull, and a jaw separation means operable to separate the skull from the jaw during and after the cheek meat is removed from the animal head.

10. Apparatus as claimed in claim 9 wherein the jaw separation means comprises a head clamp arranged to be fitted to the snout of the skull and drive means for moving the head clamp so as to move the skull relative to the jaw held by the jaw support with an at least partially arcuate path of movement so as to continue to open the mouth wider as or after the cheek meat is removed from the animal head.

11. Apparatus as claimed in claim 10 wherein the head clamp comprises a snout ring which encloses the snout of the skull when the jaw is mounted by the jaw support.

12. Apparatus as claimed in claim 11 wherein the snout ring is mounted at the end of a support arm which projects out above the animal head when supported by the jaw support, the support arm being movable downwardly to engage the snout ring around the snout.

13. Apparatus as claimed in claim 12 wherein the support arm for the snout ring is pivotally mounted to a support structure which mounts the cheek pullers the support structure being moveable in the posterior direction, the pulling force applied to the snout through the support arm and snout ring together so that with the intact connection of the jaw to the skull will open the mouth wider by arcuate movement of the skull relative to the jaw supported by the jaw support.

14. Apparatus as claimed in claim 10 wherein the drive means associated with the head clamp is operative to move the head clamp relative to the jaw with a linear component of movement in the posterior direction.

15. Apparatus as claimed in claim 14 wherein the drive means associated with the head clamp is operative to effect the linear movement in the posterior direction for a predetermined distance followed by a combined arcuate and linear movement in the posterior direction.

* * * * *